US008418053B2

(12) United States Patent
Yoshida

(10) Patent No.: US 8,418,053 B2
(45) Date of Patent: Apr. 9, 2013

(54) DIVISION PROGRAM, COMBINATION PROGRAM AND INFORMATION PROCESSING METHOD

(75) Inventor: Shigeru Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1554 days.

(21) Appl. No.: 11/393,725

(22) Filed: Mar. 31, 2006

(65) Prior Publication Data

US 2007/0150809 A1 Jun. 28, 2007

(30) Foreign Application Priority Data

Dec. 28, 2005 (JP) ................................. 2005-380328

(51) Int. Cl.
G06F 17/00 (2006.01)
(52) U.S. Cl. ........................................ 715/234; 715/236
(58) Field of Classification Search ........... 715/234–242
See application file for complete search history.

(56) References Cited

U.S. PATENT DOCUMENTS

| 6,901,403 | B1 * | 5/2005 | Bata et al. ............................... | 1/1 |
| 7,007,269 | B2 * | 2/2006 | Sluiman et al. ............... | 717/130 |
| 7,017,147 | B2 * | 3/2006 | Hayase et al. .................. | 717/108 |
| 7,146,564 | B2 * | 12/2006 | Kim et al. ....................... | 715/235 |
| 7,209,925 | B2 * | 4/2007 | Srinivasan et al. ............. | 707/602 |
| 7,210,097 | B1 * | 4/2007 | Clarke et al. ................... | 715/227 |
| 7,228,498 | B2 * | 6/2007 | Torii et al. ....................... | 715/249 |
| 7,237,225 | B2 * | 6/2007 | Kompalli et al. .............. | 717/108 |
| 7,257,818 | B2 * | 8/2007 | Foerg et al. ..................... | 719/310 |
| 7,281,206 | B2 * | 10/2007 | Schnelle et al. ............... | 715/227 |
| 7,325,187 | B2 * | 1/2008 | Yashiro ........................... | 715/249 |
| 7,337,392 | B2 * | 2/2008 | Lue ................................. | 715/236 |
| 7,392,243 | B2 * | 6/2008 | Brown et al. .......................... | 1/1 |
| 7,437,374 | B2 * | 10/2008 | Chen et al. ............................. | 1/1 |
| 7,899,834 | B2 * | 3/2011 | Oezgen .......................... | 707/758 |
| 2003/0018955 | A1 * | 1/2003 | Hayase et al. ................ | 717/114 |

(Continued)

FOREIGN PATENT DOCUMENTS

| EP | 1 628 227 A1 | 2/2006 |
| JP | 2004-287978 | 10/2004 |
| JP | 2005-11183 | 1/2005 |

OTHER PUBLICATIONS

"Streaming Transformations for XML (STX) Version 1.0", Jul. 1, 2004, from stx.sourceforge.net/documents/spec-stx-20040701.html, printed Mar. 3, 2006, first page.

(Continued)

Primary Examiner — Doug Hutton, Jr.
Assistant Examiner — Benjamin Smith
(74) Attorney, Agent, or Firm — Staas & Halsey LLP

(57) ABSTRACT

The present invention provides an information processing method converting a format of a structured document, comprising: a first step copying, a first storage unit, information of a pre-converted first structured document sequentially by a predetermined amount beginning from the head; a second step adding start tags and/or end tags, and an identifier tag for identifying the aforementioned start and/or end tags so that the information copied to the first storage unit becomes one complete second structured document; a third step converting the second structured document built up in the first storage unit to a target format and outputting it to a second storage as a third structured document; and a fourth step removing the start tags and/or end tags and the identifier tag added to in the second step from the third structured document retained by the second storage unit and merging with a fourth structured document.

7 Claims, 8 Drawing Sheets

U.S. PATENT DOCUMENTS

| | | | |
|---|---|---|---|
| 2003/0023584 A1* | 1/2003 | Brandin | 707/3 |
| 2003/0084078 A1* | 5/2003 | Torii et al. | 707/513 |
| 2003/0177443 A1* | 9/2003 | Schnelle et al. | 715/513 |
| 2004/0025116 A1* | 2/2004 | Yashiro | 715/513 |
| 2004/0044987 A1* | 3/2004 | Kompalli et al. | 717/100 |
| 2004/0098246 A1* | 5/2004 | Welch et al. | 704/3 |
| 2004/0128652 A1* | 7/2004 | Mandava et al. | 717/124 |
| 2004/0148571 A1* | 7/2004 | Lue | 715/514 |
| 2004/0210500 A1* | 10/2004 | Sobel et al. | 705/35 |
| 2005/0021709 A1* | 1/2005 | Canali et al. | 709/223 |
| 2005/0049996 A1* | 3/2005 | Srinivasan et al. | 707/1 |
| 2005/0177543 A1* | 8/2005 | Chen et al. | 707/1 |
| 2005/0177578 A1* | 8/2005 | Chen et al. | 707/100 |
| 2006/0085402 A1* | 4/2006 | Brown et al. | 707/3 |
| 2006/0233531 A1* | 10/2006 | Toyama et al. | 386/95 |
| 2007/0113170 A1* | 5/2007 | Dignum et al. | 715/513 |
| 2007/0113172 A1* | 5/2007 | Behrens et al. | 715/513 |
| 2007/0113222 A1* | 5/2007 | Dignum et al. | 717/143 |
| 2008/0021916 A1* | 1/2008 | Schnelle et al. | 707/101 |
| 2009/0006944 A1* | 1/2009 | Dang et al. | 715/234 |
| 2009/0089658 A1* | 4/2009 | Chiu et al. | 715/234 |

OTHER PUBLICATIONS

Communication mailed from the Japanese Patent Office on Jun. 21, 2011 in the related Japanese Patent Application No. 2005-380328.
Communication mailed from the Japanese Patent Office on Oct. 12, 2010 in the related Japanese Patent Application No. 2005-380328.

* cited by examiner

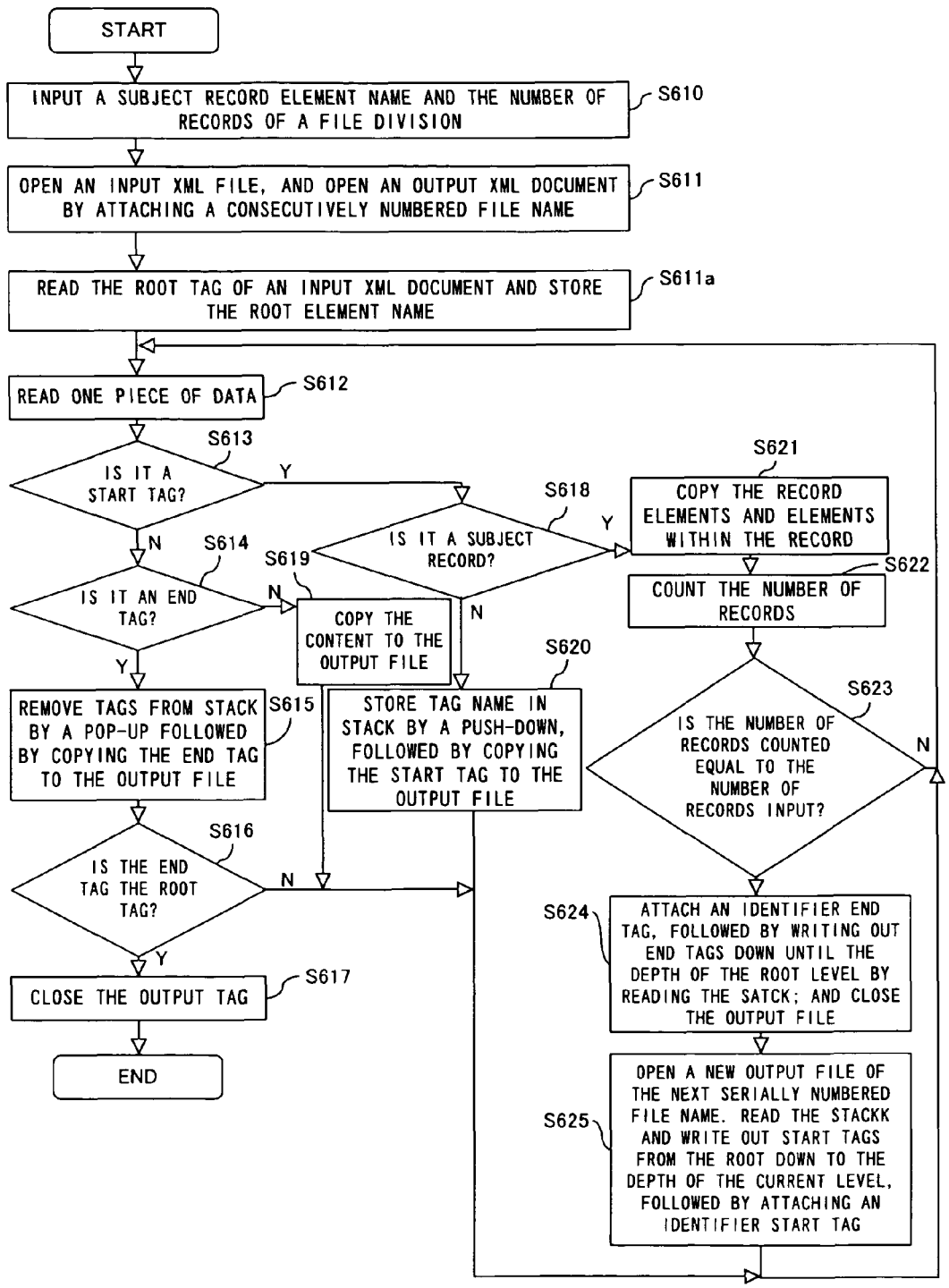
F I G. 5

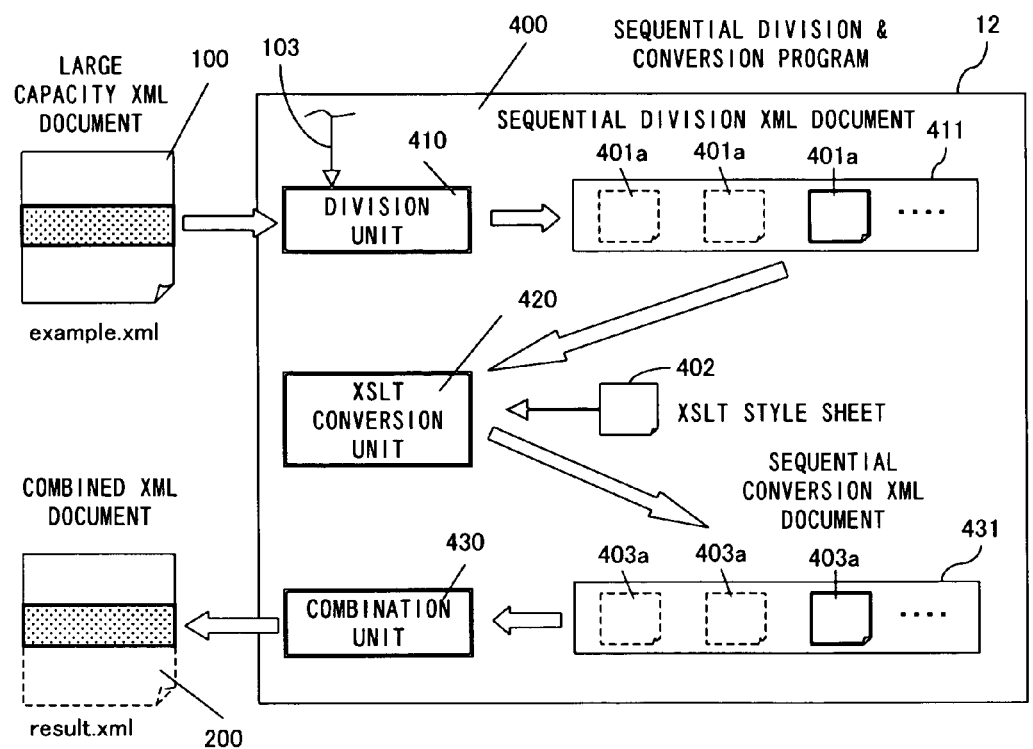
F I G. 7

DIVISION PROGRAM, COMBINATION PROGRAM AND INFORMATION PROCESSING METHOD

BACKGROUND OF THE INVENTION

1. Field of the Invention

The present invention relates to a division program, combination program, information processing technique, and to a technique effectively applicable to a processing technique used for a structured document, e.g., an XML (extensible Markup Language) document.

2. Description of the Related Art

In recent years, diverse systems, such as those of individuals, enterprises, government offices, are connected through the Internet to carry out Web services, an EDI (electronic data interchange) and an EC (electronic commerce) by the collaboration of systems.

This requires a wide range of information to be exchanged, for which the XML (extensible Markup Language) has been in the spotlight as a common platform format used for information exchange, because the XML has a flexible expression capability for structuring data and is suited to computer processing for data exchange and data processing.

The XML, originating from an SGML (Standard Generalized Markup Language) standardized by the ISO (International Organization for Standardization) in 1986, has been established by the W3C (World Wide Web Consortium) as its basic specification XML 1.0 in February 1998 for the purpose of easy utilization on the Internet. The HTML (Hyper Text Markup Language), which is a Web page creation language, has fixed tags which are specialized for a display, being faced with a problem of not responding to the requirement of information processing by a computer based on the tag information. The XML allows a user to define a tag freely, has a language structure for giving meaning to a character string within a document and allows information processing by a computer.

In the case of applying a handling such as search, update and delete to an XML document, it is handled by expanding it into to a tree structure (Document Object Model: DOM) by standard API (Application Programming Interface) software. Expansion into a DOM tree, however, requires an operating memory volume of up to five to ten times that of the original data and moreover develops unused items, thus having the shortcoming of being time-consuming.

The following is a description of problems of the conventional technique concerning the above described XML.

(1) Regarding the XML

Here, the following is how the terminology is used based on the XML standard. A character string enclosed by a pair of "<" and ">" is called a tag, a "<character string>" is called a start tag, a "</character string>" is called an end tag, an entire character string from a start tag to an end tag is called an element, a character string sandwiched between a start tag and an end tag is called an element content, a name of an element described within a tag is called an element name (or a tag name), and additional information for an element is called an attribute.

A structured document describes a data structure in the form of embedding a tag within the document itself. Having a structure of embedding a data structure in the document as a tag keeps a flexibility and extensibility against an addition, deletion and modification of data items. And naming with a meaningful name makes data possess a visibility when a person reads it.

(2) Standard API Handling of XML Documents

Two standard interfaces (API: Application Programming Interface) specifications, i.e., DOM (Document Object Model) and SAX (Simple API for XML), are established for the purpose of handling an XML document as a representative structured document.

SAX has the characteristics of small memory consumption, generally high speed, being a time-series output, and is thus suitable for simple processing for referencing.

DOM on the other hand has the characteristics of large memory consumption, generally low speed and easy of programming even for a complex processing content because elements of a document are expanded a hierarchical tree. DOM is usually used for updating an XML document.

(3) Conversion of a Large Capacity XML Document

The XSLT conversion equipped as standard in an XML environment is used for a form conversion of an XML document. The XSLT conversion, however, consumes a large amount of memory of about ten times a file size and therefore it is hard to convert a large capacity XML document of the scale of 50 MB or larger. Accordingly, the below described countermeasures (i), (ii) and (iii) have conventionally been taken. While the countermeasure (i) is the least cumbersome, it has been difficult for a document having a complex structure.

(i) Division and conversion of a file: a conceivable method is to divide a file into a plurality thereof to convert them, followed by combing the converted files for converting a large capacity XML document. It is, however, necessary to divide an XML document having a complex data structure at the most convenient dividing position, hence necessary to rely on a manual work.

(ii) Conversion by streaming processing: (a) a conversion program is written for a standard API SAX (Simple API for XML). This requires an individual new program; (b) use STX (Steaming Transformations for XML) (e.g., refer to a non-patent document 1). The (b) method is non-standard, requiring a standard style sheet to be rewritten for matching with a special specification. Since it is a single-pass stream processing, it has a shortcoming of data handling for conversion being constrained.

(iii) Use of an RDB: a large capacity XML document is once stored in an RDB (Relational Data Base) and processed in the RDB followed by extracting it as a converted XML document. This method requires an RDB handling, a new program to be created, and is hence cumbersome.

A flexible data expression form though it is, XML has a shortcoming of data processing, consuming a large volume of memory.

As a countermeasure to the above problem, a patent document 1 has disclosed a technique for developing a partial tree with analyzed elements as nodes, and also deleting unnecessary nodes when a prescribed stopping condition as a trigger occurs, thereby making analysis processing continue without falling short of memory in the case of processing an XML document by DOM.

The case of the patent document 1, however, requires a change of an operating specification of DOM per se and also a determination of individual stopping conditions according to a processing content, hence lacking versatility.

[Non-patent document 1] "Streaming Transformations for XML (STX) Version 1.0", searched on Dec. 8, 2005; Internet <http://stx.sourceforge.net/>

[Patent document 1] Laid-open Japanese Patent Application Publication No. 2005-11183

SUMMARY OF THE INVENTION

A purpose of the present invention is to provide a technique for enabling a reduction of resources necessary for a data processing of a structured document such as an XML document without requiring a user intervention.

Another purpose of the present invention is to provide a technique for enabling an automatic conversion processing of a structured document such as a large capacity XML document having a complex data structure without requiring unnecessarily large memory resources.

Yet another purpose of the present invention is to provide a technique for enabling a conversion processing of a structured document such as a large capacity XML document having a complex data structure by using a general purpose conversion technique without requiring unnecessarily large memory resources.

A first aspect of the present invention is to provide a signal for carrying a division program for dividing information contained in a first structured document into a plurality of second structured documents, wherein the division program makes a computer execute first processing for copying the information of the first structured document in each of the second structured documents, which has a proper name corresponding to a sequence of division, sequentially by a predetermined amount beginning from the head, and second processing for adding a start tag and/or an end tag to the second structured documents so that each of the second structured documents has the same hierarchical structure as the first structured document.

A second aspect of the present invention is to provide the signal for carrying a division program noted in the first aspect, wherein the division program further makes a computer execute third processing for adding an identifier tag in order to identify said start and/or end tags which are added to each of said second structured documents.

A third aspect of the present invention is to provide the signal for carrying a division program noted in the first aspect, wherein said first and second structured documents are XML documents described by the extensible markup language (XML).

A fourth aspect of the present invention is to provide a signal for carrying a combination program, wherein the program makes a computer execute first processing for reading information in a sequence based on a proper name given to each of first structured documents in a manner to indicate a combination sequence from each of a plurality of the aforementioned first structured documents having a common hierarchical structure, and second processing for merging with the second structured document having the same hierarchical structure as the first structured document following removal of a redundant start tag and/or end tag which are included in the information.

A fifth aspect of the present invention is to provide the signal for carrying a combination program noted in the fourth aspect, wherein said second processing is for identifying and removing a redundant said start tag and/or end tag based on an identifier tag added to each of said first structured documents in order to identify the aforementioned redundant start tag and/or end tag.

A sixth aspect of the present invention is to provide the signal for carrying a combination program noted in the fourth aspect, wherein said first and second structured documents are XML documents described by the extensible markup language (XML).

A seventh aspect of the present invention is to provide an information processing method for converting a format of a structured document, comprising: a first step for copying, in a first storage unit, information of a pre-converted first structured document sequentially by a predetermined amount beginning from the head; a second step for adding a start tag and/or an end tag, and an identifier tag for identifying the aforementioned start and/or end tags so that the information copied to the first storage unit becomes one complete second structured document; a third step for converting the second structured document built up in the first storage unit to a target format and outputting it to a second storage as a third structured document; and a fourth step for removing the start tag and/or end tag and the identifier tag added to in the second step from the third structured document retained by the second storage unit and merging with a fourth structured document.

An eighth aspect of the present invention is to provide the information processing method noted in the seventh aspect, wherein said third step is for carrying out a CSV compaction conversion which assembles a plurality of elements contained in said second structured document by lining them up in a CSV (Comma Separated Values) style.

A ninth aspect of the present invention is to provide the information processing method noted in the seventh aspect, wherein said structured document is an XML document described by the extensible markup language (XML).

The present invention is comprised to read an XML document by using a stream type API, divide it into a plurality of documents of a specified size and assign serial numbers to file names of the divided files so that a division sequence may be comprehended at the time of combining them, when dividing and converting a large capacity XML document for instance.

Also comprised is to memorize the current hierarchical level at the time of a division processing so as to make each divided file an XML document, add a "start tag" and an "end tag" of matched level depth at a discretionary division position and also insert an "identifier tag" for identifying the addition of start and end tags.

This comprisal makes it possible to combine and write the divided file in a sequence of file names by using the streaming type API after the division, delete the start and end tags added for the convenience of the division and reproduce a converted document in the original XML format. Since the divided files are of the same as a pre-divided file, they allow a handling without changing an XSLT style sheet.

Conventionally, a conversion of a large capacity XML document uses the above noted countermeasure (iii) in many cases, because the aforementioned document is stored in an RDB and processed. As a future trend, a method of data processing in a main memory is predicted to become popular as prices of memory become inexpensive, in order to take advantage of the merits of XML. In such a case, the possibility of being able to convert a large capacity XML document based on the standard specification is desirable.

The present invention provides a benefit of enabling an automatic conversion of a complex structured XML document regardless of its size by using a standard XSLT conversion since an input XML document is divided and then subjected to a conversion processing. Reading and writing a large capacity XML document at the time of dividing and combining by using a stream type API makes this possible without requiring a large amount of main storage.

That is, the present invention enables an automatic division processing and conversion processing of a complex structured XML document. Also enabled is conversion processing of a large capacity XML document in a main storage, which is predicted to become increasingly popular in the future, by using a standard XML conversion.

XML documents are largely categorized into two types by their characteristics as follows:

One is called a data-centric XML document, such as a form or schedule chart, which is characterized as having a number of tags and short element content.

The other one is called a document-centric XML document, such as magazine, manual or dictionary, which is characterized as having long element content a sentence.

The present invention enables a simplification of an API with the data type XML document for example as a target.

The present invention enables a handling of a data-centric XML documents for example, particularly an XML document, being expressed by a record form, is handled as a data base.

This comprisal enables a conversion of a large capacity XML documents in the unit of records for example by using a standard XSLT style sheet without requiring a volume increase of main storage.

BRIEF DESCRIPTION OF THE DRAWINGS

FIG. 5 is a flow chart exemplifying division processing of a large capacity XML document according to the embodiment of the present invention;

FIG. 7 is a conceptual diagram exemplifying a sequential division and conversion processing according to a modified example of an embodiment of the present invention.

DESCRIPTION OF THE PREFERRED EMBODIMENTS

The following is a detailed description of the preferred embodiment of the present invention in reference to the accompanying drawings.

Figure 1:
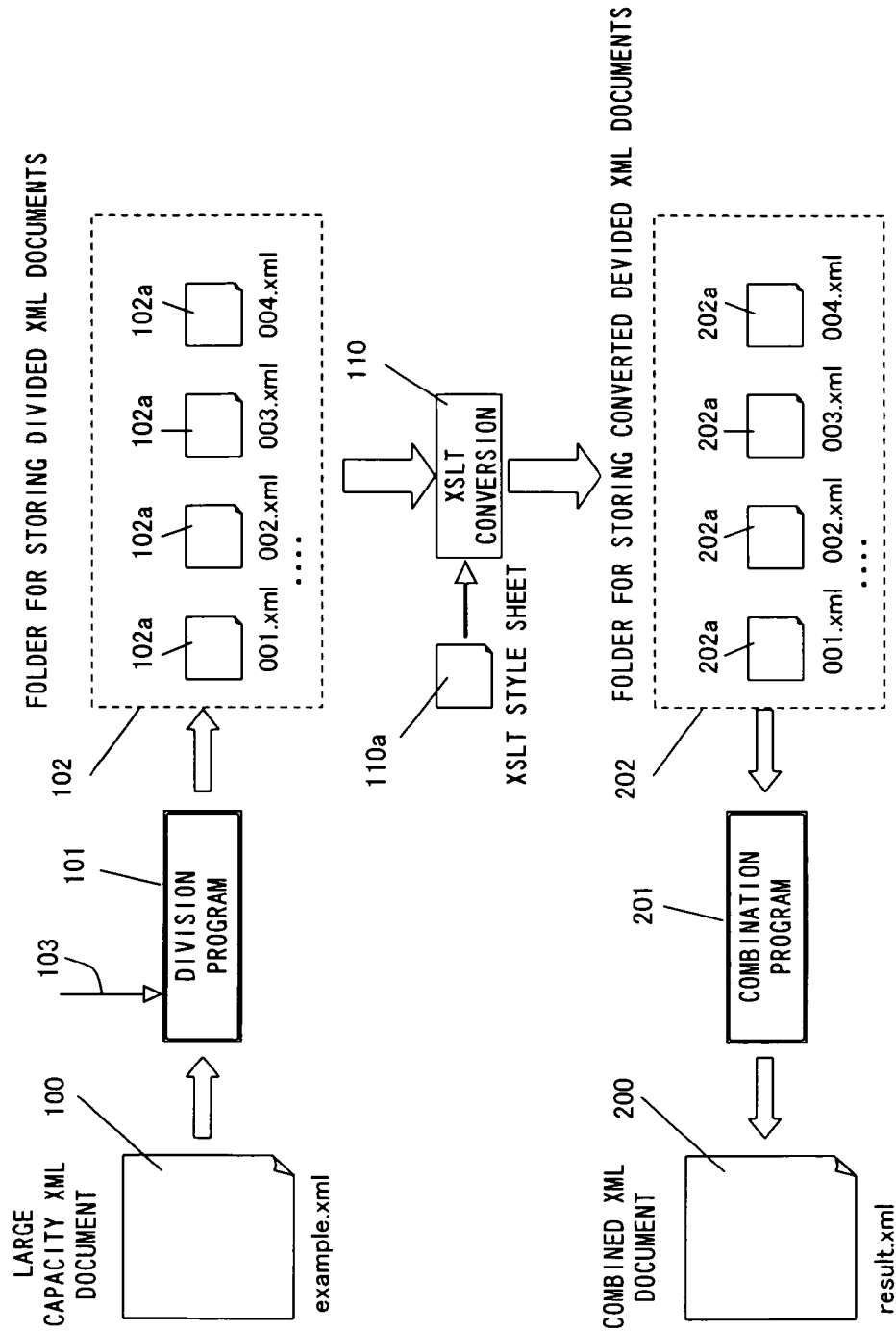
FIG. 1 is a conceptual diagram exemplifying operations of a division program, combination program and information processing method according to an embodiment of the present invention.

FIG. 1 is a conceptual diagram exemplifying operations of a division program, combination program and information processing method according to an embodiment of the present invention.

Figure 2:
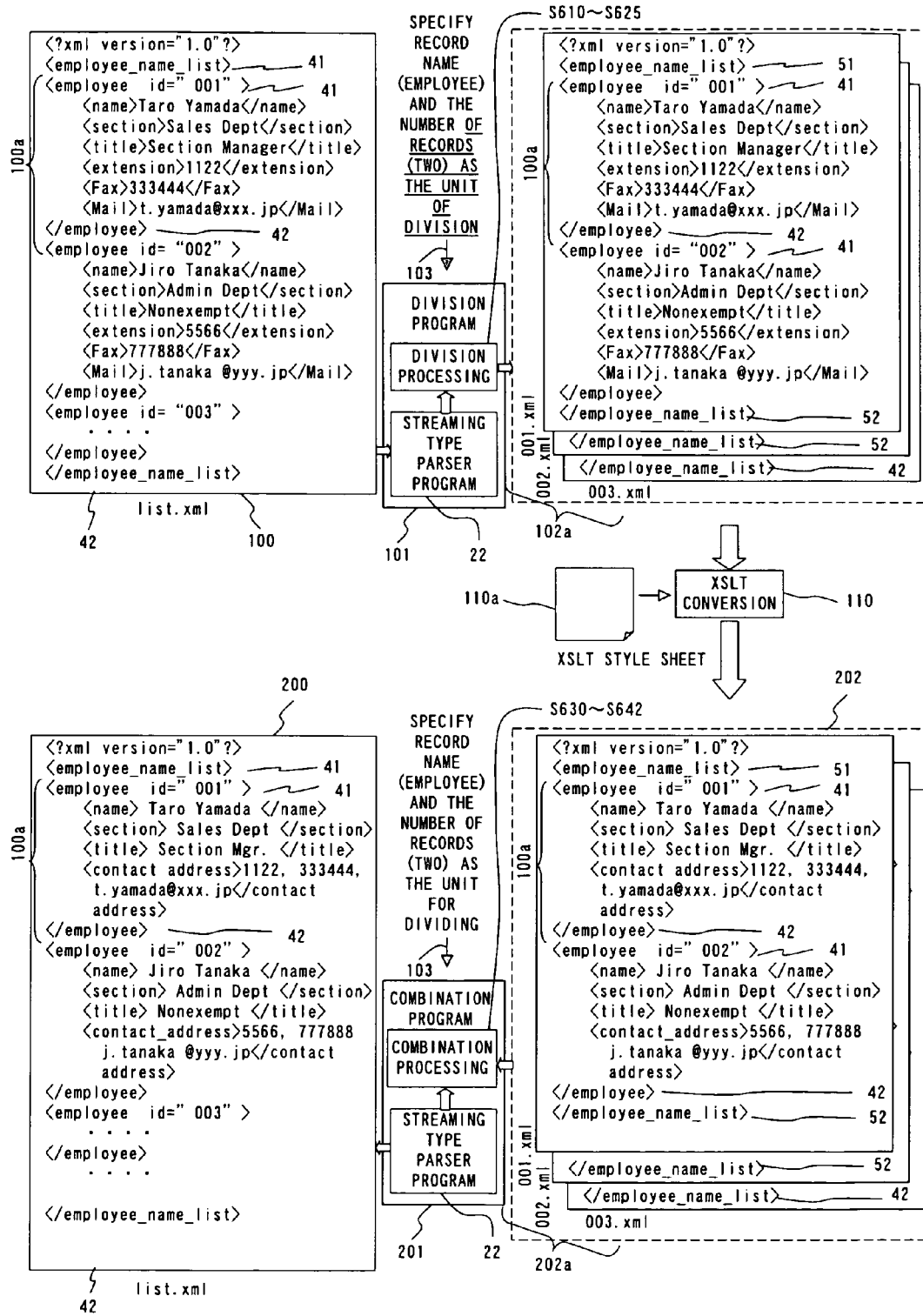
FIG. 2 is a conceptual diagram further concretely exemplifying operations of a division program, combination program and information processing method according to an embodiment of the present invention.

FIG. 2 is a conceptual diagram further concretely exemplifying operations of a division program, combination program and information processing method according to an embodiment of the present invention.

Figure 3:
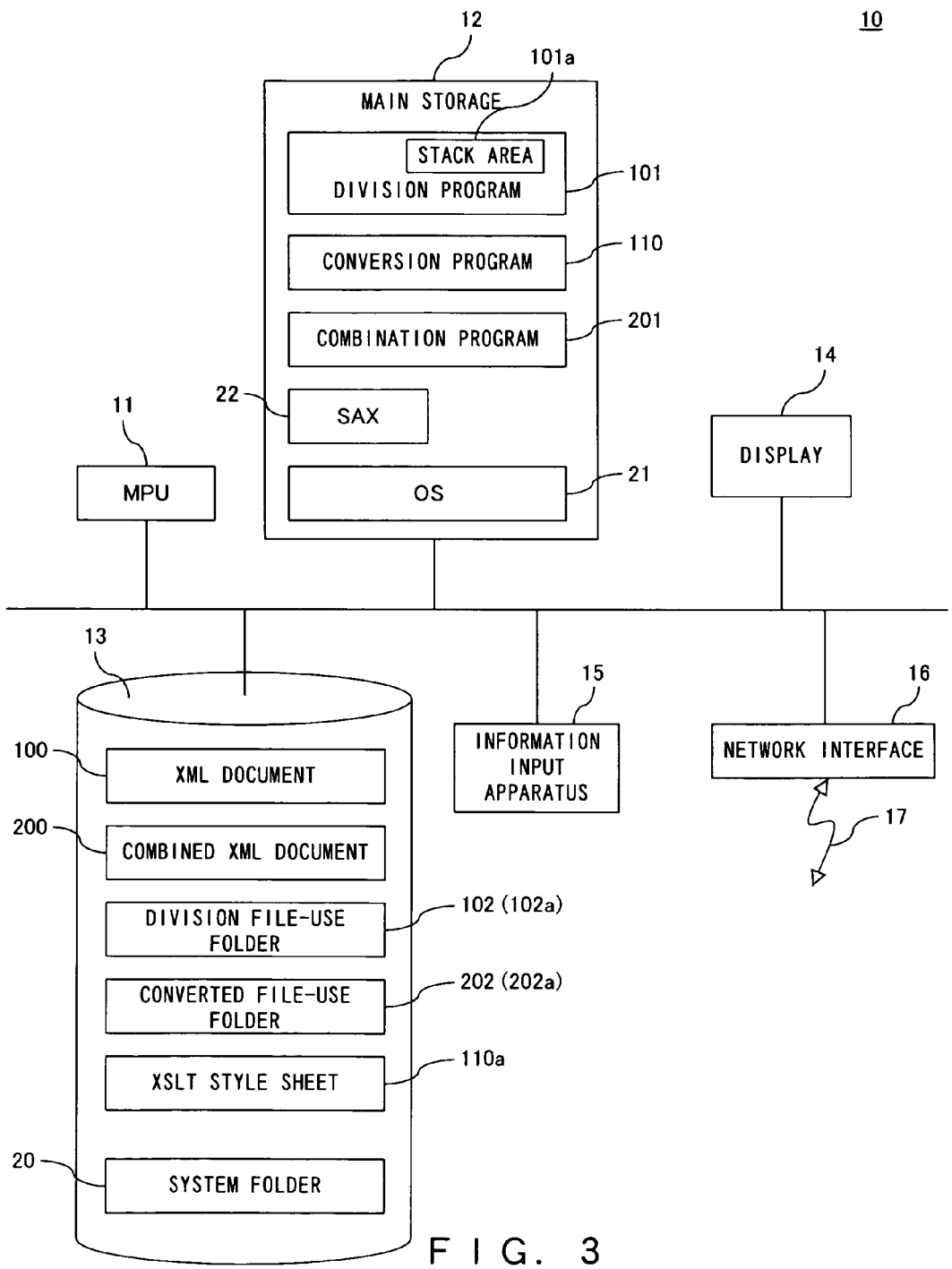
FIG. 3 is a conceptual diagram exemplifying a configuration of an information processing apparatus for embodying a division program, combination program and information processing method according to the embodiment of the present invention.

FIG. 3 is a conceptual diagram exemplifying a configuration of an information processing apparatus for embodying a division program, combination program and information processing method according to the embodiment of the present invention.

The first description is of a configuration example of an information processing apparatus 10 according to the embodiment of the present invention by referring to FIG. 3.

The information processing apparatus 10 according to the present embodiment includes a central processing apparatus 11, a main storage 12, an external storage apparatus 13, a display 14, an information input apparatus 15 and a network interface 16.

The central processing apparatus 11, being comprised by a microprocessor, et cetera, executes a program installed in the main storage 12, thereby carrying out a desired information processing.

The main storage 12, being comprised by a semiconductor memory for example, stores software executed by the central processing apparatus 11, and data.

The present embodiment is configured to let the main storage 12 install software including an operating system 21, a streaming type parser program 22, a division program 101, an XSLT conversion processor 110, a combination program 201, et cetera.

The central processing apparatus 11 executes the operating system 21, thereby controlling an entire operation of the information processing apparatus 10.

The streaming type parser program 22, division program 101, XSLT conversion processor 110 and combination program 201 are application programs operating under the control of the operating system 21.

The external storage apparatus 13 is made up of a storage apparatus comprising a nonvolatile storage medium.

The present embodiment is configured to make the external storage apparatus 13 store a system folder 20, a large capacity XML document 100, a combined XML document 200, a folder 202 and a XSLT style sheet 110*a*.

The system folder 20 stores software including the above noted operating system 21, streaming type parser program 22, division program 101, XSLT conversion processor 110, combination program 201 and sequential division & conversion program 400, et cetera, which are executed by being read in the main storage 12 on an as required basis.

The streaming type parser program 22 is an event driven type XML parser such as SAX (Simple API for XML).

The division program 101, while performing a structural analysis byway of the streaming type parser program 22, carries out the processing of reading a large capacity XML document and dividing it into a plurality of small capacity XML documents 102*a*.

The division program 101 has a stack area 101*a* for temporarily storing tag information of an input large capacity XML document 100 in a pushdown/pop-up system.

The XSLT conversion processor 110 carries out a conversion processing defined in a XSLT style sheet 110*a* by the XSLT (extensible Stylesheet Language Transformations) for each of the plurality of small capacity XML documents 102*a* and outputs the conversion result to each of the plurality of small capacity XML documents 202*a* respectively.

The combination program 201 carries out the processing of generating a combined XML document 200 by combining a plurality of small capacity XML documents 202*a*.

The display 14 performs a visible display of information.

The information input apparatus 15, comprising information input equipment such as a keyboard, mouse, etcetera, provides an information input interface between a user and information processing apparatus 10. The present embodiment is configured to use it for an input of later described division control information 103.

The network interface 16 provides a telecommunication interface for carrying out a telecommunication between the information processing apparatus 10 and the outside.

The above described pieces of information stored by the external storage apparatus 13 may be placed in an external server apparatus or storage apparatus (neither of which are shown herein) by way of the network interface 16 and accessed by the information processing apparatus 10.

FIG. 1 shows an overall process of the information processing method according to the present embodiment for dividing and converting a large capacity XML document.

FIG. 1 shows the case of inputting a large capacity XML document 100 and dividing it into small capacity XML documents 102a by using the division program 101. The plurality of divided small capacity XML documents 102a are given serially numbered file names for storage in the folder 102.

Next small capacity XML documents 102a are taken out one by one from the folder 102 and an XSLT conversion is carried out at the XSLT conversion processor 110 by using the XSLT (extensible Stylesheet Language Transformations). The converted plurality of small capacity XML documents 202a are stored in the folder 202 with the same serially numbered file names as the pre-converted small capacity XML documents 102a to which they correspond.

Next the XML documents in the folder 202 are taken out one by one, combined by using the combination program 201 and the resultant combined XML document 200 is obtained.

FIG. 2 examplifies a division and conversion in the case of a simple one level large capacity XML document.

The large capacity XML document 100 (i.e., list.xml) as the subject of processing shown by FIG. 2 is a list of employee names, having a list of record elements "employee" of respective employees, as a record 100a, under the root element "employee_name_list", which has a simple data structure.

Specifying a record name and the number of records per file for the division program 101 divides the large capacity XML document 100 into the small capacity XML documents 102a. In this case, the division is carried out just by taking out the number of record elements specified by the user by the division control information 103 and attaching an additional start tag 51 and an additional end tag 52 of the root element "employee_name_list" to the small capacity XML documents 102a.

That is, the first small capacity XML document 102a is attached only with an additional end tag 52 of the root element "employee_name_list" at the end.

The last small capacity XML document 102a is attached only with an additional start tag 51 of the root element "employee_name_list" at the head of the document.

The small capacity XML document 102a in the middle is attached with an additional start tag 51 and an additional end tag 52 of the root element "employee_name_list" at the start and at the end respectively.

Meanwhile, the combination program 201 enables a combination into one combined XML document by removing a redundant additional start tag 51 and additional end tag 52 within each of the small capacity XML documents 202a based on the number of records 100a specified by the division control information 103 in a method reversal of that described above.

This makes each of the small capacity XML documents 102a become part of one complete combined XML document, allowing a processing by the XSLT conversion processor 110.

Although the XSLT conversion processor 110 expands the entirety of input small capacity XML documents 102a in a work area of the main storage 12, a memory volume of the work area is small because the small capacity XML documents 102a are only of small capacity and hence it is unnecessary to make the main storage 12 large.

In the conversion example of the XSLT conversion processor 110 shown by FIG. 2 the case of carrying out a CSV compaction conversion is shown. That is, enumerating data of each element, i.e., "extension", "fax" and "contact_address", contained in the level of the element "employee" by commas "," as separation and consolidating in the newly set "contact_address", thereby reducing the data volume as a result of omitting a start and end tags for each element.

The next description is of a modified example of the present embodiment in which the case of applying to an XML document having more complex hierarchical level structure. Note that shown here, is a CSV compaction processing for a part of record elements, i.e., "customer", "product" and "matter", as individual record 100a for example, although a conversion processing is not particularly shown by a figure herein.

Figure 4:
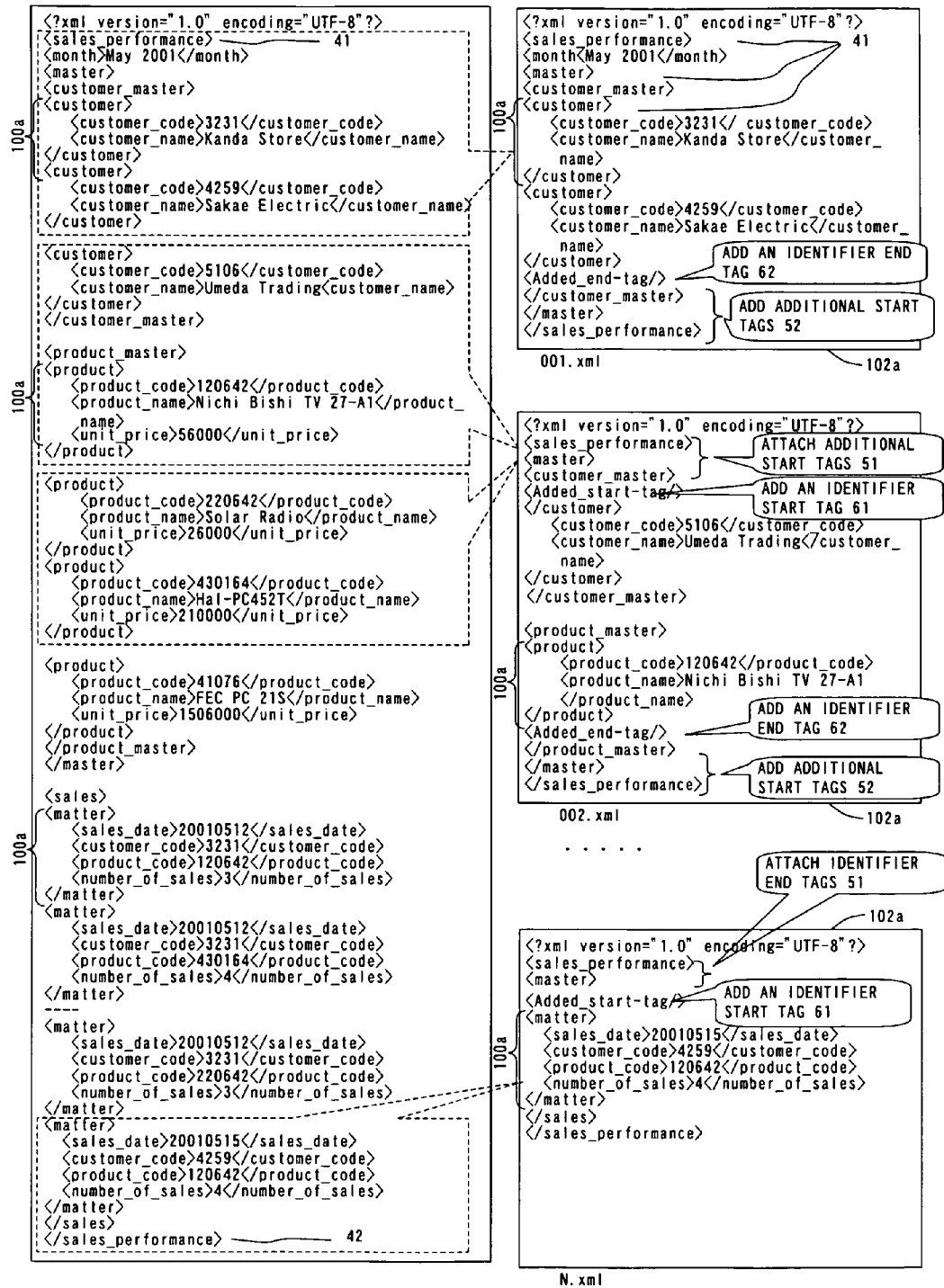
FIG. 4 is a conceptual diagram exemplifying an application of a division and conversion technique according to an embodiment of the present invention to an XML document having a hierarchical level and plurality of record elements.

FIG. 4 is a conceptual diagram examplifying an application of a division and conversion technique, according to the present embodiment, into an XML document having hierarchical levels and a plurality of record elements.

FIG. 5 is a flow chart examplifying division processing of a large capacity XML document according to the present embodiment.

Figure 6:
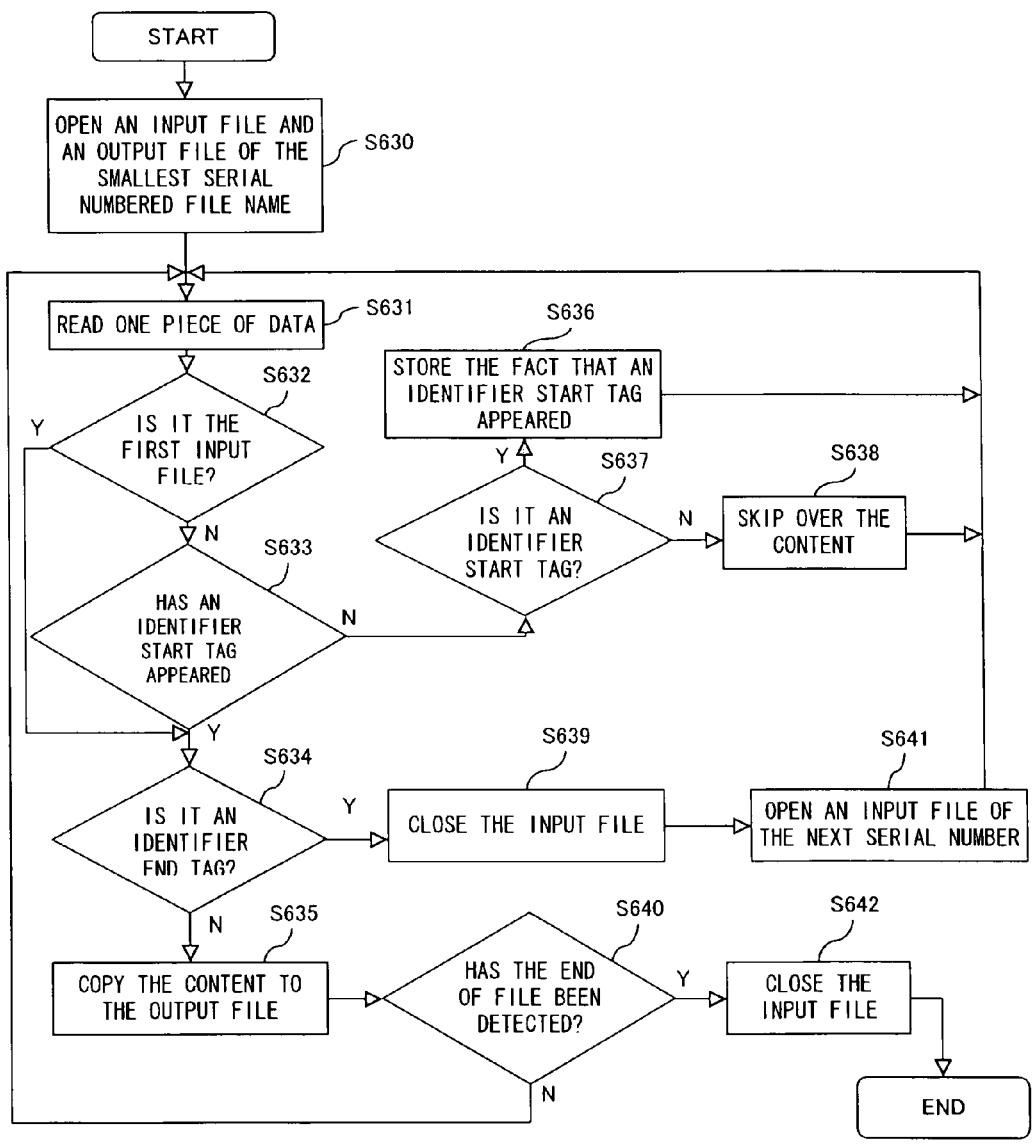
FIG. 6 is a flow chart exemplifying a combination processing of divided small capacity XML documents according to the embodiment of the present invention.

FIG. 6 is a flow chart exemplifying a combination processing of divided small capacity XML documents according to the present embodiment.

Referring to FIG. 4, a large capacity XML document 100 (lists.xml) as the subject is data of a sales performance. This has elements "master" and "sales" under the root element "sales_performance", and further levels "customer_master" and "product_master" under the "master".

And three kinds of record elements, i.e., "customer" within "customer_master", "product" within "product_master" and "matter" within "sales", and the number of records of the unit of division are externally specified as the division control information 103.

A large capacity XML document 100 actually has tens of thousand to hundred of thousand of records 100a and a small capacity document is divided into units of hundreds to thousands of records. The small capacity XML document 102a shown on the right side of FIG. 4 examplifies the case of the records 100a being divided into two per document.

A division into small capacity XML documents is carried out by specifying "customer", "product" and "matter" as the record names and "2" for the number of records both by the division control information 103 for the division program 101.

The first small capacity XML document 102a (001.xml) is copied down to the point where two of the specified records 100a appear when looking at the large capacity document from the head. This is followed by attaching additional end tags 52 (i.e., </customer_master>, </master> and </sales_performance>) corresponding to the original start tags 41 (i.e., <sales_performance>, <master> and <customer_master>) down to the level relevant to the aforementioned point and also attaching an identifier end tag 62 (i.e., <Added_end-tag/>) at the head of these additional end tags 52, thereby making one complete XML document having the same hierarchical structure as the original large capacity XML document 100.

To the second small capacity XML document 102*a* (002.xml) is added a tag of the level of the former XML document as start tags (i.e., an additional start tag 51), followed by adding an identifier start tag 61 (i.e., <Added_start-tag/>) to the additional start tags 51.

Next is to copy from the point of interruption to a point of the specified number of records of the large capacity XML document 100, followed by adding an identifier end tag 62 and end tags (i.e., an additional end tag 52) down to the relevant level, thereby making a complete XML document.

From the third small capacity XML document 102*a* to one document prior to the last small capacity XML document 102*a*, the same operation as that applied to the second document is repeated.

To the last small capacity XML documents 102*a* is added start tags of the level (i.e., an additional start tags 51) and an identifier start tag 61 for beginning a generation processing to copy less than the number of specified records, in the same way as the start of the second small capacity XML documents 102*a*, and therefore an end tag of the level (i.e., an end tag 42) is also copied as is to finish the processing.

The above described division operation operates so that each of the divided small capacity XML documents 102*a* has the same hierarchy as the original large capacity XML document 100 and the specified number of records 100*a*. This allows each of the small capacity XML documents 102*a* to be converted without any change to the XSLT style sheet 110*a*.

For a combination operation, copying while searching for an identifier start tag 61 and an identifier end tag 62 from the divided document (i.e., the post-conversion small capacity XML documents 202*a* in this case) and, if there is an identifier end tag 62, then additional end tags 52 of levels thereafter down to the end of the document are discarded. In this case, a specifying by the division control information 103 is not required for the combination processing.

For the next document, an operation is repeated in which additional start tags 51 of the levels from the head to the identifier start tag 61 are discarded, and contents between the next and just before the identifier end tag 62 (i.e., <Added_end-tag>) are copied. By so doing, the redundant tags (i.e., an additional start tag 51 and an additional end tag 52) attached at the time of division are all deleted and the hierarchy of the original large capacity XML document 100 is restored.

The next description is of a greater detail of a division processing by the division program 101 according to the present embodiment by referring to the flow chart shown by FIG. 5.

First, the step S610 is to input, from the information input apparatus 15 or a file, the element name, and the number of records of the unit of file division, of a subject record 100*a* as division control information 103.

Then the step S611 is to open an input XML file (i.e., a large capacity XML document 100) and also the first output file (i.e., a small capacity XML document 102*a*) of serially numbered files to be divided.

Then the step S611*a* reads the root tag of the input large capacity XML document 100 and store the root element name.

The step S612 reads the contents of the large capacity XML document 100 line by line.

If the read content is a start tag and is not the subject record 100*a* of the steps S613 and S618, then the step S620 the tag name is accumulated on the stack (i.e., the stack area 101*a*) by a pushdown, followed by copying the start tag in the small capacity XML document 102*a* and going back to the step S612.

If the read content is a start tag and is the subject record 100*a* in the steps S613 and S618, the step S621 is to copy all the record elements and elements within the record.

Then, the step S622 is to count the number of records and, if the counted value is judged to have reached the number of records inputted as the division control information 103 in the step S623, then the step S624 attaches an identifier end tag 62 (i.e., <Added_end-tag/>) for identification, followed by writing out tags of stacked levels down to the root element as an end tag 42 and closing the small capacity XML document 102*a* as the output file.

Then, the step S625 opens a new serially numbered output file (i.e., a small capacity XML document 102*a*) and writes out tags down to the current stacked level from the root element as the start tag (i.e., an additional start tag 51), followed by attaching an identifier start tag 61 (i.e., <Added_start-tag/>). Then returns to the step S612. If the number of counted records is judged not to have reached the input number of records, returns to the step S612 as is.

If the read content is judged not to be a start tag in the step S613, and if an end tag is detected in the step S614, then the step S615 is to remove one tag name from the stacked level tags by a pop-up, followed by copying the end tag into the output file.

Then, if the end tag is judged as a root tag in the step S616, the step S617 is to close the output file to end the processing. If the end tag is judged not to be a root tag, return to the step S612.

If the read content is judged to be neither a start tag nor an end tag in the step S614, and rather is an element content, the step S619 copies the content directly to the output file, followed by returning to the step S612.

Thus a plurality of divided small capacity XML documents 102*a* have the same hierarchical structure as the original large capacity XML document 100 and therefore allow conversion processing without changing the XSLT style sheet 110*a* described based on the hierarchical structure of the original large capacity XML document 100 in the conversion processing such as a CSV compaction, et cetera, by the XSLT conversion processor 110 by using the XSLT style sheet 110*a* for instance.

Note that the identifier start tag 61 and identifier end tag 62 are inherited from the pre-converted small capacity XML documents 102*a* to the post-conversion small capacity XML document 102*a* in the above described conversion processing.

FIG. 6 is a flow chart examplifying an operation of the combination program 201 according to the present embodiment. Note that the case shown by FIG. 6 recognizes redundant additional start tags 51 and additional end tags 52 by using an identifier start tag 61 and identifier end tag 62 and therefore a specification by division control information 103 is not required.

First, the step S630 opens a divided file (i.e., a post-conversion small capacity XML document 202*a*) of the smallest serial numbered file name and also an output file (i.e., a combined XML document 200) of a combination output destination.

The step S631 reads one of the contents of the input file (i.e., a small capacity XML document 102*a*). In the step S632, if the judgment is that it is the first input file, jump to the S634 to copy the read contents to the output file in the step S635 until an identifier end tag 62 appears (as per a judgment of S634).

When an identifier end tag 62 appears in the step S634, then the step S639 closes the input file and the step S641 opens the next input file, followed by returning to the step S631.

Next, if it is an input file of the second in sequence or thereafter, the step S633 examines whether an identifier start tag 61 has appeared. If an identifier start tag 61 has not appeared, the step S637 examines whether the read content is an identifier start tag 61 and, if it is so, the step S636 stores the fact that the identifier start tag 61 appeared, followed by returning to the step S631.

If it is judged that an identifier start tag 61 has not yet appeared in the step S633 and, if the read content is not an identifier start tag 61, then the step S638 skips the read content, followed by returning to the step S631.

If an identifier start tag 61 is judged to have already appeared in the step S633 and if the read content is not an identifier start tag 61, then the step S635 copies the read content to the output file followed by judging whether an end of file of the input file is detected in the step S640.

If an end of file of the input file is judged as not being detected in the step S640, return to the step S631.

If an end of file of the input file is judged as being detected in the step S640, then the step S642 closes the input file and ends the processing.

If an identifier start tag 61 is judged as being detected in the step S634, then the processing is the same as that of the first file.

As described above, the modified example shown by FIGS. 4, 5 and 6 attaches an additional start tag 51 and/or additional end tag 52 by matching with a depth of tag levels before and after the dividing position when dividing a large capacity XML document 100 into a plurality of small capacity XML documents 102a. This configuration enables a division into small capacity XML documents 102a accurately and automatically even in the case of a large capacity XML document 100 having a relatively complex structure.

Conversely, combining small capacity XML documents 202a obtained by a conversion processing of a plurality of small capacity XML documents 102a into a combined XML document 200 enables an accurate and complete construction of the combined XML document 200 as a result of removing the redundant additional start tags 51 and/or additional end tags 52 by referring to an identifier start tag 61 and/or an identifier end tag 62 as a mark.

And the storage resources of the main storage 12 consumed by the XSLT conversion processor 110 at the time of generating small capacity XML documents 202a by applying conversion processing to a plurality of small capacity XML documents 102a requires only a small capacity corresponding to each thereof. This eliminates a necessity to increase a capacity of the main storage 12 by matching that of the large capacity XML document 100.

That is, to an arbitrarily sized large capacity XML document 100 can be applied automatically and confidently, a conversion processing without a concern over a shortage of the main storage 12 capacity.

The above described embodiment is configured to divide a large capacity XML document 100 into a plurality of small capacity XML documents 102a in a lump, output to each of a plurality of small capacity XML documents 202a by converting in a lump, and output small capacity XML documents 202a to a combined XML document 200 in a lump. This makes it a division and conversion in a lump (also called a "lumped division and conversion" hereinafter).

Comparably with the above described, a sequential division and conversion can be carried out in the same way as shown in FIG. 7. In the case of the sequential division and conversion, small capacity documents (i.e., sequential division XML documents 401a) of a predetermined number of records are cut out of a large capacity XML document 100 to a division buffer 411 in the main storage 12 and the divided documents are converted and output to sequential conversion XML document 403a. And the conversion result is added to the combined XML document 200.

Carrying out the operation sequentially from the head of the large capacity XML document 100 to the end makes it possible to generate a combined XML document 200 in a state of a post-conversion plurality of small capacity XML documents 202a being combined together just by securing storage areas (i.e., a division buffer 411 and a combination buffer 431), in the main storage 12, for one divided document of small capacity XML documents 102a and one converted divided document of each of post-conversion small capacity XML documents 202a, without furnishing the external storage apparatus 13 with storage memory areas for a plurality of small capacity XML documents 102a or small capacity XML documents 202a.

A sequential division & conversion program 400 includes a division unit 410, an XSLT conversion unit 420, a combination unit 430, a division buffer 411 and a combination buffer 431.

The division unit 410, while carrying out the same processing as the above described division program 101, differs in its output part.

That is, the case of the division unit 410 comprises the function of instructing the XSLT conversion unit 420 for a conversion start at the time of one sequential division XML document 401a being built in the division buffer 411, and that of building the next sequential division XML document 401a in the division buffer 411 at the notification of a conversion completion from the XSLT conversion unit 420 as a trigger.

Also the combination unit 430 is a little different from the combination program 201 for the function of the input side. That is, the combination unit 430 comprises the function of inputting a sequential conversion XML document 403a in the combination buffer 431 and additionally outputting to the combined XML document 200.

The XSLT conversion unit 420 carries out a conversion processing, which is defined by a style sheet 402 described by the XSLT (eXtensible Stylesheet Language Transformations), for a sequential division XML documents 401a read out from the division buffer 411 and output to the combination buffer 431 as a sequential conversion XML document 403a. The conversion processing by the style sheet 402 conceptually includes a CSV compaction for example.

Note that the sequential division & conversion program 400 can be accomplished by a shell script if the above described division program 101, XSLT conversion processor 110 and combination program 201 comprise a standard input & output function and if the operating system 21 is a multitasking operating system.

That is, to allocate a large capacity XML document 100 by way of a streaming type parser program 22 as standard input of the division program 101 (i.e., the division unit 410) and connect the standard output to the standard input of the XSLT conversion processor 110 (i.e., XSLT conversion unit 420) at the next stage.

And to connect the standard output of the XSLT conversion processor 110 to the standard input of the combination program 201 (i.e., the combination unit 430) at the next stage and allocate the standard output of the combination program 201 to the combined XML document 200 by way of the streaming type parser program 22.

In this case, to allocate sizes according to the number of input records to the division buffer 411 and combination buffer 431.

Figure 8:
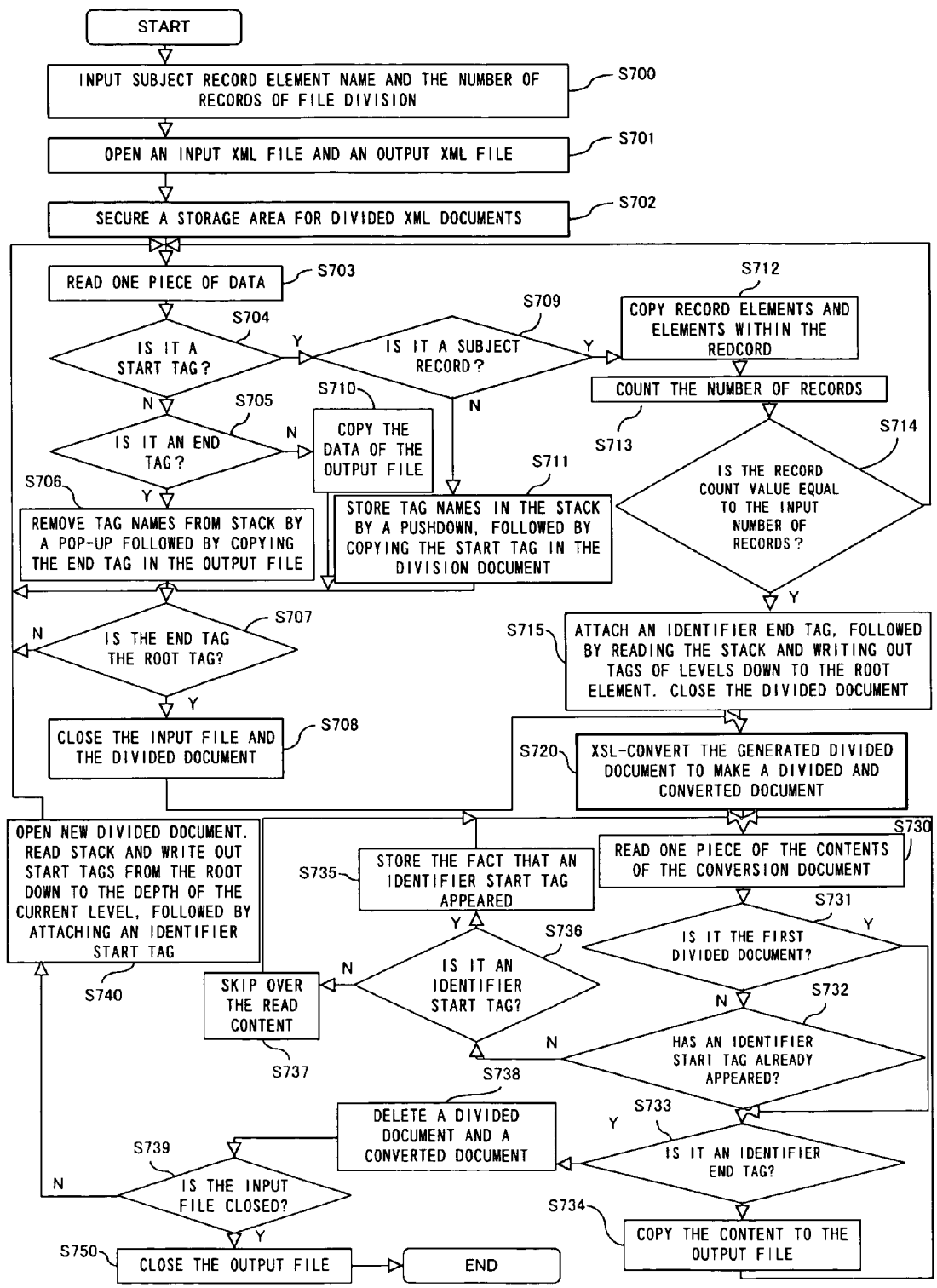
FIG. 8 is a flow chart exemplifying an operation of a sequential division and conversion processing according to a modified example of an embodiment of the present invention.

The next description is an operation of the above described sequential division and conversion. FIG. 8 is a flow chart exemplifying an operation of a sequential division and conversion processing according to the present embodiment.

First, the step S700 inputs the element name of a target record 100a and the number of records of the unit of file division as the division control information 103 from the information input apparatus 15 or a file.

Then the step S701 opens an input XML file (i.e., a large capacity XML document 100 and also the first output file (i.e., a combined XML document 200) of the dividing serially numbered file names.

Then, the step S702 secures a storage area for a sequential division XML document 401a in the division buffer 411 and also reads the root tag of the input large capacity XML document 100 to store the root element name.

The step S703 reads the contents of the large capacity XML document 100 line by line.

If the read content is judged to be a start tag and a subject record 100a in the steps S704 and S709 respectively, the step S712 copies all the record elements and elements within the record.

Then the step S713 counts the number of records and, if the counted value is judged to have reached the number of records input as the division control information 103 in the step S714, the step S715 attaches an identifier end tag 62 (i.e., <Added_end-tag/>), followed by writing out tags of stacked levels down to the root element as an end tag 42 and closing the sequential division XML document 401a that is the output file.

Then, the step S720 converts the generated sequential division XML documents 401a by the XSLT conversion unit 420, and generating a sequential conversion XML document 403a in the combination buffer 431.

If the number of counted records is judged as not reaching the number of input records in the step S714, return to the step S703 as is.

In the above described step S709, if the read content is judged as a start tag and not a subject record 100a, the step S711 stores the tag name in the stack by a pushdown, followed by copying the start tag in the sequential division XML documents 401a and returning to the step S703.

If the judgment in the step S704 is that it is not a start tag, and if an end tag is detected in the step S705, then the step S706 removes one tag of the stacked tag names by a pop-up and copies the end tag to the output file.

Then, if the end tag is judged as the root tag in the step S707, the step S708 closes the input file (i.e., the large capacity XML document 100) and the sequential division XML documents 401a to execute the step S720. If the end tag is judged not to be the root tag, return to the step S703.

If the read content is neither a start tag nor an end tag, and is an element content in the step S704, S705, the step S710 copies the read content directly to the output file, followed by going back to the step S703.

Following the above described step S720, the step S730 reads one of contents of the input file (i.e., the sequential conversion XML document 403a). If it is judged to be the first input file in the step S731, jump to the step S733 and copy the read contents at the step S734 to the output file until an identifier end tag 62 appears.

If an identifier end tag 62 appears in the step S733, then the step S738 deletes the sequential division XML documents 401a and sequential conversion XML documents 403a and, if the input file (i.e., the large capacity XML document 100) is closed in the step S739, then the step S750 closes the combined XML document 200 and ends the processing.

If the input file (i.e., the large capacity XML document 100) is judged not to be closed in the step S739, the step S740 opens a new sequential conversion XML document 403a and writes out tags of the root element down to the current stacked level as additional start tags 51, followed by attaching an identifier start tag 61 (i.e., <Added_start-tag>) for identification, and returning to the step S703.

Then, if it is judged as the second (i.e., not the first) sequential conversion XML document 403a or thereafter, in the above described step S731, then the step S732 examines whether an identifier start tag 61 has already appeared. If an identifier start tag 61 has not appeared, the step S736 examines whether the read content is an identifier start tag 61 and, if it is as such, the step S735 is to store the fact that the identifier start tag 61 appeared and return to the step S730.

If an identifier start tag 61 is judged not to have appeared in the step S732 and if the read content is not an identifier start tag 61 in the step S736, then in the step S737 skip the read content and return to the step S730.

If an identifier start tag 61 is judged to have already appeared in the step S732 and if the read content is not an identifier start tag 61 in the step S733, then the step S734 copies the read content to the output file, followed by returning to the step S730.

As such, the case of a sequential division and conversion by using the sequential division & conversion program 400 does not necessarily require outputting a sequential division XML document 401a or sequential conversion XML document 403a as a file to the external storage apparatus 13, enabling a data processing in the main storage 12, hence making it possible to carry out a high speed division and conversion of a large capacity XML document 100, although the structure of the sequential division & conversion program 400 becomes relatively complex.

That is, the case of a sequential division and conversion of a large capacity XML document 100 can carry out conversion processing at a high speed and output to a combined XML document 200 without being conscious of the storage capacities of the external storage apparatus 13 or main storage 12.

The following is a comparison of the advantages of the lumped division and conversion, and the sequential division and conversion.

The lumped division and conversion makes the structure of software such as the division program 101, folder 102, et cetera, simple.

The divided files such as the small capacity XML documents 102a and the small capacity XML documents 202a are once retained in the folders 102 and 202, hence enabling the processing such as update, addition, delete, et cetera, in the folders 102 and 202, respectively.

Each divided file, such as the small capacity XML document 102a and the small capacity XML document 202a, is of a small capacity, making data updating processing easy.

Although a sorting processing with a record 100a being a unit requires an execution in a large capacity XML document 100, a combination of an "XML CSV compaction" (refer to laid-open Japanese patent application publication Nos. 2003-203067 and 2005-267531), which are inventions filed with the relevant patent offices by the inventor of the present invention, and the division and conversion according to the present embodiment makes it possible to carry out a sort processing while saving resources.

On the other hand, the case of the sequential division and conversion does not necessarily require outputting a sequential division XML document 401a or a sequential conversion XML document 403a as a file to the external storage apparatus 13, enabling a data processing in the main storage 12, hence making it possible to carry out a high speed division and conversion of a large capacity XML document 100, although the structure of the sequential division & conversion program 400 becomes relatively complex as described above.

The following is the description of a modified example of the present embodiment.

The above described present embodiment examplifies the case of having one CSV element within a record when carrying out a CSV compaction as a conversion processing as exemplified by the element "contact_address" within the record 100a of "employee" in the small capacity XML documents 202a. Also in the case of making a CSV element plural, this can be managed in an API by describing element names stored in the plurality of CSV elements in the header of a CSV compaction document (i.e., a combined XML document 200), and by reading in the same way as the described above and using a for-two data associative array.

Note that it goes without saying that the present invention can be changed in various ways within the scope thereof, and is not limited by the configurations exemplified by the above described embodiment.

The present invention provides a technique for enabling a reduction of necessary resources for a data processing of a structured document such as an XML document without requiring a user intervention.

Also enabled is an automatic conversion processing of a structured document such as a large capacity XML document having a complex data structure without requiring unnecessarily large memory resources.

Also enabled is a conversion processing of a structured document such as a large capacity XML document having a complex data structure by using a general purpose conversion technique without requiring unnecessarily large memory resources.

What is claimed is:

1. An apparatus for dividing information contained in a first structured document into a plurality of second structured documents, comprising:
   a storage device to store the first structured document and the plurality of second structured documents; and
   a central processing unit connected to the storage device via a bus, wherein the central processing unit is configured to:
   obtain a content of the first structured document sequentially line by line beginning from the head;
   when the obtained content includes a start tag and there is no record between the start tag and an end tag corresponding to the start tag, store a tag name of the start tag by pushdown into a stack and copy a tag name of the start tag of the obtained content into a first output file different from the first structured document;
   when the obtained content includes a start tag and there is a record between the start tag and the end tag corresponding to the start tag, copy an element relating to the record at an end of the first output file;
   add an identifier end tag indicating a position corresponding to a record count value to determine a dividing position in accordance with a number of the record as the dividing position, generate an additional end tag corresponding to the start tag of the first output file by using the start tag stored in the stack, and add the additional end tag after the identifier end tag of the first output file;
   after generating the first output file, generate an additional start tag corresponding to the additional end tag in the first output file by using the start tag stored in the stack, and add an identifier start tag corresponding to the identifier end tag of the first output file;
   when the content obtained from the first structured document includes the element relating to the record, copy the content indicating the element relating to the record to the second output file;
   when the content obtained from the first structured document includes an end tag, popup a name of a tag of the first tag stored in the stack, and copy the obtained end tag at an end of the second output file; and
   when a root tag of the first structured document matches the end tag, terminate dividing processing, and generate the plurality of second structured documents.

2. The apparatus according to claim 1, wherein said first and second structured documents are XML documents described by the extensible markup language (XML).

3. A method for dividing information contained in a first structured document into a plurality of second structured documents, comprising:
   obtaining a content of the first structured document sequentially line by line beginning from the head using a computer;
   when the obtained content includes a start tag and there is no record between the start tag and an end tag corresponding to the start tag, storing a tag name of the start tag by pushdown into a stack and copying a tag name of the start tag of the obtained content into a first output file different from the first structured document;
   when the obtained content includes a start tag and there is a record between the start tag and the end tag corresponding to the start tag, copying an element relating to the record at an end of the first output file;
   adding an identifier end tag indicating a position corresponding to a record count value to determine a dividing position in accordance with a number of the record as the dividing position, generating an additional end tag corresponding to the start tag of the first output file by using the start tag stored in the stack, and adding the additional end tag after the identifier end tag of the first output file;
   after generating the first output file, generating an additional start tag corresponding to the additional end tag in the first output file by using the start tag stored in the stack, and adding an identifier start tag corresponding to the identifier end tag of the first output file;
   when the content obtained from the first structured document includes the element relating to the record, copying the content indicating the element relating to the record to the second output file;
   when the content obtained from the first structured document includes an end tag, popup a name of a tag of the first tag stored in the stack, and copying the obtained end tag at an end of the second output file; and
   when a root tag of the first structured document matches the end tag, terminate dividing processing, and generating the plurality of second structured documents.

4. A non-transitory computer readable medium storing a program for dividing information contained in a first structured document into a plurality of second structured documents, the program adapted to be executed to implement a method on a computer, the method comprising:
   obtaining a content of the first structured document sequentially line by line beginning from the head;
   when the obtained content includes a start tag and there is no record between the start tag and an end tag corresponding to the start tag, storing a tag name of the start tag by pushdown into a stack and copying a tag name of the start tag of the obtained content into a first output file different from the first structured document;

when the obtained content includes a start tag and there is a record between the start tag and the end tag corresponding to the start tag, copying an element relating to the record at an end of the first output file;

adding an identifier end tag indicating a position corresponding to a record count value to determine a dividing position in accordance with a number of the record as the dividing position, generating an additional end tag corresponding to the start tag of the first output file by using the start tag stored in the stack, and adding the additional end tag after the identifier end tag of the first output file;

after generating the first output file, generating an additional start tag corresponding to the additional end tag in the first output file by using the start tag stored in the stack, and adding an identifier start tag corresponding to the identifier end tag of the first output file;

when the content obtained from the first structured document includes the element relating to the record, copying the content indicating the element relating to the record to the second output file;

when the content obtained from the first structured document includes an end tag, popup a name of a tag of the first tag stored in the stack, and copying the obtained end tag at an end of the second output file; and when a root tag of the first structured document matches the end tag, terminate dividing processing, and generating the plurality of second structured documents.

5. The apparatus according to claim 1, wherein
the central processing unit combines the plurality of second structured documents, the central processing unit being further configured to:

obtain a content of the second structured document line by line in a divided order beginning from the head;

copy the obtained content to a third output file different from the second structured document;

when an end tag is present after the identifier end tag as a result of detecting the identifier end tag in the obtained content, the end tag is identified as the additional end tag, not copy the identifier end tag and the additional end tag to the third output file; and when a start tag is present before the identifier start tag as a result of detecting the identifier start tag in the obtained content, the start tag is identified as the additional start tag, not copy the identifier start tag and the additional start tag to the third output file.

6. The method according to claim 3, further comprising:
combining the plurality of second structured documents using the computer, the combining comprising:

obtaining a content of the second structured document line by line in a divided order beginning from the head;

copying the obtained content to a third output file different from the second structured document;

when an end tag is present after the identifier end tag as a result of detecting the identifier end tag in the obtained content, the end tag is identified as the additional end tag, not copying the identifier end tag and the additional end tag to the third output file; and when a start tag is present before the identifier start tag as a result of detecting the identifier start tag in the obtained content, the start tag is identified as the additional start tag, not copying the identifier start tag and the additional start tag to the third output file.

7. The medium according to claim 4, wherein the method further comprises:

combining the plurality of second structured documents, the combing comprising:

obtaining a content of the second structured document line by line in a divided order beginning from the head;

copying the obtained content to a third output file different from the second structured document;

when an end tag is present after the identifier end tag as a result of detecting the identifier end tag in the obtained content, the end tag is identified as the additional end tag, not copying the identifier end tag and the additional end tag to the third output file; and when a start tag is present before the identifier start tag as a result of detecting the identifier start tag in the obtained content, the start tag is identified as the additional start tag, not copying the identifier start tag and the additional start tag to the third output file.

* * * * *